US006785621B2

(12) United States Patent
Ebert

(10) Patent No.: US 6,785,621 B2
(45) Date of Patent: Aug. 31, 2004

(54) METHOD AND APPARATUS FOR ACCURATELY DETERMINING THE CROSSING POINT WITHIN A LOGIC TRANSITION OF A DIFFERENTIAL SIGNAL

(75) Inventor: Gregory L. Ebert, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 09/967,169

(22) Filed: Sep. 27, 2001

(65) Prior Publication Data

US 2003/0060992 A1 Mar. 27, 2003

(51) Int. Cl.[7] .............................................. G06F 7/02
(52) U.S. Cl. ............................ 702/66; 702/67; 702/70; 702/71
(58) Field of Search ............................. 702/64–67, 69, 702/117, 70, 73, 74, 107, 124, 126, 188, 189; 356/28; 375/355; 359/180; 324/103

(56) References Cited

U.S. PATENT DOCUMENTS

| 4,006,413 | A | * | 2/1977 | Silberberg | 324/103 |
| 6,377,640 | B2 | * | 4/2002 | Trans | 375/354 |
| 2002/0116196 | A1 | * | 8/2002 | Tran | 704/270 |
| 2003/0016770 | A1 | * | 1/2003 | Trans et al. | 375/346 |

* cited by examiner

Primary Examiner—Marc S. Hoff
Assistant Examiner—Felix Suarez
(74) Attorney, Agent, or Firm—Rob Anderson

(57) ABSTRACT

A method is described that involves forming a product waveform by multiplying a positive signal waveform and negative signal waveform. The positive signal waveform and the negative signal waveform are representative of a logical transition within a differential signal. The crossing point voltage of the logical transition within the differential signal is determined by calculating the square root of a maximum of the product waveform.

49 Claims, 11 Drawing Sheets

METHOD AND APPARATUS FOR ACCURATELY DETERMINING THE CROSSING POINT WITHIN A LOGIC TRANSITION OF A DIFFERENTIAL SIGNAL

FIELD OF THE INVENTION

The field of invention relates to the measurement of signal waveforms, generally; and, more specifically, to a method and apparatus for accurately determining the crossing point within a logic transition of a differential signal.

BACKGROUND

FIG. 1a shows an embodiment of a differential signal. A differential signal typically has two signal components. A first signal 102a (usually referred to as the "positive" or "+" signal) is indicative of the logical information being transported by the differential signal. A second signal 103a (usually referred to as the "negative" or "−" signal) is indicative of the inverse of the logical information being transported by the differential signal.

For example, note that the differential signal observed in FIG. 1a shows a 10101010 data pattern. As such, the + signal 102a is logical "high" for each "1" in the data pattern and a logical "low" for each "0" in the data pattern (noting that a logical high voltage is larger than a logical low voltage). Inversely, the − signal 103a is a logical "low" for each "1" in the data pattern and a logical "high" for each "0" in the data pattern.

Note that the 10101010 data pattern of FIG. 1a corresponds to a series of alternating logical values. That is, the logical values of the data pattern repeatedly change from a "0" to a "1" and from a "1" to a "0". Each logical change (which may also be referred to as a logical transition) within FIG. 1a is approximately marked by a vertical line (e.g., noting that a first logical transition is approximately marked by the vertical line positioned at time T1).

FIG. 1b is a depiction of a "zoom in" of the first logical transition within FIG. 1a (which, as alluded to just above, is approximately positioned at time T1 and corresponds to a transition within the data pattern from a "1" to a "0"). Note that the logical high voltage is marked as $V_{OH}$ and the logical low voltage is marked as $V_{OL}$. As such a logical transition from a "1" to a "0", as seen in FIG. 1b, typically involves the transitioning of the + signal waveform 102b from $V_{OH}$ to $V_{OL}$ and the − signal waveform 103b from $V_{OL}$ to $V_{OH}$ (correspondingly, not shown in FIG. 1b, a logical transition from a "0" to a "1" typically involves the transitioning of the + signal waveform from $V_{OL}$ to $V_{OH}$ and the − signal waveform from $V_{OH}$ to $V_{OL}$).

A characteristic of a logical transition within a differential signal is the "crossing point" of the logical transition. A crossing point 104, as seen in FIG. 1b, corresponds to the voltage where the transitioning + signal waveform 102b and the transitioning − signal waveform 103b "meet". That is, if the + signal 102b waveform and the − signal 103b waveform are overlayed upon another (e.g., with an oscilloscope that samples and displays both waveforms simultaneously) they eventually meet (or cross one another) at the crossing point 104.

FIG. 1b shows an embodiment of an ideally symmetrical logical transition. Indicia of an ideally symmetrical logical transition may include equal rates as between the fall rate of the + signal waveform 102b and the rise rate of the − signal waveform 103b; and, the + signal waveform 102b begins to fall at the same time the − signal waveform 103b begins to rise. As a result of these characteristics, the crossing point 104 is positioned approximately midway between $V_{OH}$ and $V_{OL}$. That is, voltage 105 is the same as voltage 106. Many if not most logical transitions, however, deviate from the ideally symmetrical logical transition observed in FIG. 1b.

FIG. 2 shows a plurality of crossing points 204a, 204b, 204c that result from the logical transition from a "1" to a "0" for various pairs of + signal waveforms 202a, 202b, and 202c and − signal waveforms 203a, 203b, 203c. Specifically: crossing point 204a results from a "1" to "0" logical transition that comprises + signal waveform 202a and − signal waveform 203a; crossing point 204b results from a "1" to "0" logical transition that comprises + signal waveform 202b and − signal waveform 203b; and crossing point 204c results from a "1" to "0" logical transition that comprises + signal waveform 202c and − signal waveform 203c.

Crossing point 204b and +/− signal waveform pairs 202b, 203b correspond approximately to the ideally symmetrical logical transition discussed above with respect to FIG. 1b. Crossing points 204a and 204c, however, result from +/− signal pairs that deviate from an ideally symmetrical relationship. That is, + signal waveform 202a begins to fall significantly after − signal waveform 203a begins to rise, resulting in a crossing point 204a that is above crossing point 204b. Similarly, + signal waveform 202c begins to fall significantly before − signal waveform 203c begins to rise, resulting in a crossing point 204c that is below crossing point 204b.

In light of the fact that many if not most logical transitions deviate from an ideally symmetrical logical transition, it is not uncommon for a differential signal to demonstrate a spread of crossing point positions over time. That is, if a plurality of logical transitions from the same differential signal are overlayed upon one another (as observed in FIG. 2), a plurality of different crossing points 204a, 204b, 204c are likely to be observed.

BRIEF DESCRIPTION OF THE DRAWINGS

The present invention is illustrated by way of example and not limitation in the figures of the accompanying drawings.

FIG. 1b shows an embodiment of a logical transition within the differential signal of FIG. 1a.

FIG. 3b shows the product of the + signal waveform and the − signal waveform for the pair of signal waveforms that create crossing point 312 in FIG. 3a.

FIG. 3c shows the product of the + signal waveform and the − signal waveform for the pair of signal waveforms that create crossing point 311 in FIG. 3a.

FIG. 3d shows the product of the + signal waveform and the − signal waveform for the pair of signal waveforms that create crossing point 310 in FIG. 3a.

FIG. 8b shows the product of the + signal waveform and the − signal waveform for the pair of signal waveforms that create crossing point 810 in FIG. 8a.

FIG. 8c shows the product of the + signal waveform and the − signal waveform for the pair of signal waveforms that create crossing point 811 in FIG. 8a.

FIG. 8d shows the product of the + signal waveform and the − signal waveform for the pair of signal waveforms that create crossing point 812 in FIG. 8a.

DETAILED DESCRIPTION

The logical value of a differential signal is typically defined as:

Logical Value="1" if (+ signal)>(− signal); or

"0" if (+ signal)<(− signal);    Eqn. 1

That is, when the + signal waveform is at a higher voltage than the − signal waveform, the differential signal has a logical value of "1"; and, when the + signal waveform is at a lower voltage than the − signal waveform, the differential signal has a logical value of "0". Thus, in theory, the crossing point described above corresponds to the exact moment that the logical value of a differential signal changes. Note however, that the term "logical transition" should be construed to include at least a portion of the rising and falling waveforms that create a crossing point. A waveform is an electronic signal or a representation of the voltage(s) that form an electronic signal over time. The representation may be in the form of voltages that are sampled from an electronic signal, digital representations of voltages that are sampled from an electronic signal, a display of an electronic signal, etc.

Measuring the crossing point of a logical transition within a differential signal can be usefull in various ways. For example, electrical circuitry that receives a differential signal is typically designed to "look for" (or otherwise perceive) the presence of the crossing point so that a change in logical value may be triggered. As such, the reception circuitry may be designed to trigger a logical change if the crossing point falls within some specified range; and, if the crossing point falls outside the specified range, the ability of the reception circuitry to trigger the logical change in a timely manner may degrade or suffer.

Electrical circuitry that transmits a differential signal may be specifically designed to induce a crossing point within the specified range expected by the reception circuitry. As such, in order to characterize the performance of either the transmitting circuitry or the receiving circuitry, it may be usefull to measure one or more crossing points that exist within a differential signal (e.g., to understand whether or not the transmission circuitry is inducing the crossing points within their specified range; and/or to understand whether or not the reception circuitry is properly triggering logical changes for those crossing points that reside within the specified range).

Figure 3A:
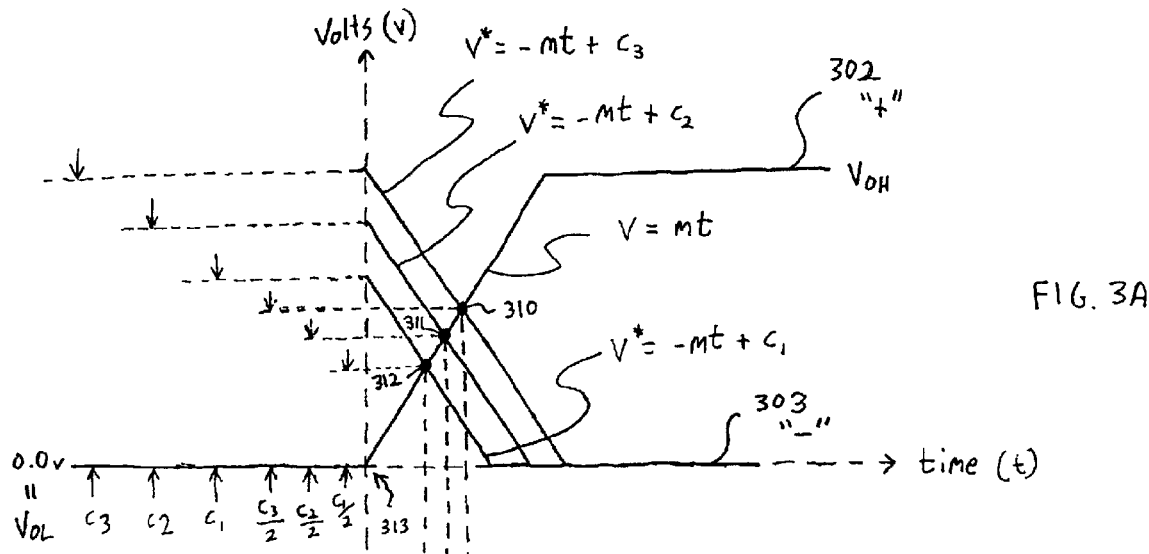
FIG. 3a shows a model for a differential signal logical transition.

FIG. 3a shows a model for a differential signal logical transition that may be used to measure the crossing point that resides therein. Before continuing, however, it should be understood that the description of various crossing point measurement techniques that follows below can be performed even if a range of crossing points is not specified for the circuit being tested. That is, uses or purposes other than those described just above may be found where the crossing point measurement techniques described below can be utilized.

FIG. 3a may be viewed as an embodiment of a "straight-line" approximation for a logical transition within a differential signal. FIG. 3a may be viewed as the overlay of three logical transitions each from a "0" to a "1". As such, the + signal 302 rises over the course of the logical transition from a logic low voltage $V_{OL}$ to a logic high voltage $VO_H$; and, the − signal 303 falls over the course of the logical transition from a logic high voltage $V_{OH}$ to a logic low voltage $V_{OL}$.

Note that, for simplicity, each of the three logical transitions observed in FIG. 3a have an identically positioned + signal 302. As a result only one − signal waveform 302 is observed in FIG. 3a because the overlay of a second + signal waveform falls directly "on top of" the lower, first + signal waveform; and, the overlay of a third + signal waveform falls directly "on top of" the lower second + signal waveform. Note the identical positioning of the + signal waveforms 302 as described above is made for simplification purposes only. As such, the crossing point measurement technique described below may be used across a plurality of logical transitions that have dissimilarly positioned + signal waveforms (or − signal waveformss).

Note the "tv" coordinate system of FIG. 3a. That is, a horizontal axis (the "t" axis) runs horizontally at the $V_{OL}$ voltage level; and a vertical axis (the "v" axis) runs vertically at time 0.0 secs. The t axis corresponds to time and the v axis corresponds to voltage. As a result of the particular alignment of the "tv" coordinate system, the origin of the coordinate system corresponds to point 313 which, in turn, corresponds to (approximately) the point in time that the + signal 302 begins to rise. As such, in accordance with the mathematics of a "straight-line" approach, the rising portion of the + signal waveform may be expressed as a line:

$$v = mt \qquad \text{Eqn. 2}$$

where v is the voltage of the waveform, t is the time that voltage v appears, and m is the slope or rate (in volts/sec) at which the + signal waveform 303 rises.

Note that the − signal waveforms 303 associated with the three overlayed logical transitions of FIG. 3a are dissimilar and are also given a straight-line approximation. That is, the falling portion of a first − signal waveform, which produces crossing point 312, may be expressed as $v = -mt + c_1$; the falling portion of a second − signal waveform, which produces crossing point 311, may be expressed as $v = -mt + c_2$; and the falling portion of a third − signal waveform, which produces crossing point 310, may be expressed as $v = -mt + c_3$. As such, the falling portion of the − signal waveforms may be expressed generically as:

$$v^* = -mt + cx \qquad \text{Eqn. 3}$$

where x=1, 2 or 3 depending on which of the three falling portions is being expressed. Note that, as another approximation, the rate at which the + signal waveform 302 rises (m volts/sec) is the same as the rate at which the − signal waveform 302 falls (−m volts/sec). As described in more detail below, the crossing point of a logical transition may be measured according to the techniques described below even if the rise and fall rates are different.

The product F(t) of the rising signal waveform and the falling signal waveform, within the logical transition of a differential signal, may be expressed as:

$$F_X(t)=v^*v=-m^2t^2+c_X mt \qquad \text{Eqn. 4}$$

where x=1, 2 or 3 depending on which of the three falling portions is being expressed. Note that FIG. 3b shows $F_1(t)$ for the first falling portion (i.e., $F_1(t)=-m^2t^2+c_1 mt$ for v*=−mt+$c_1$), FIG. 3c shows $F_2(t)$ for the second falling portion (i.e., $F_2(t)=-m^2t^2+c_2 mt$ for v*=−mt+$c_2$) and FIG. 3d shows $F_3(t)$ for the third falling portion (i.e., $F_3(t)=-m^2t^2+c_3 mt$ for v*=−mt+$c_3$).

Figure 3B:
Figure 3C:
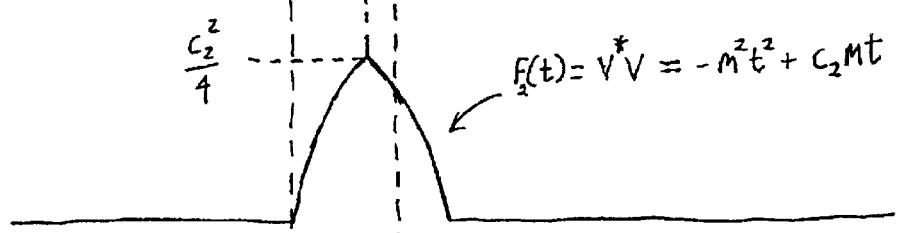
Figure 3D:
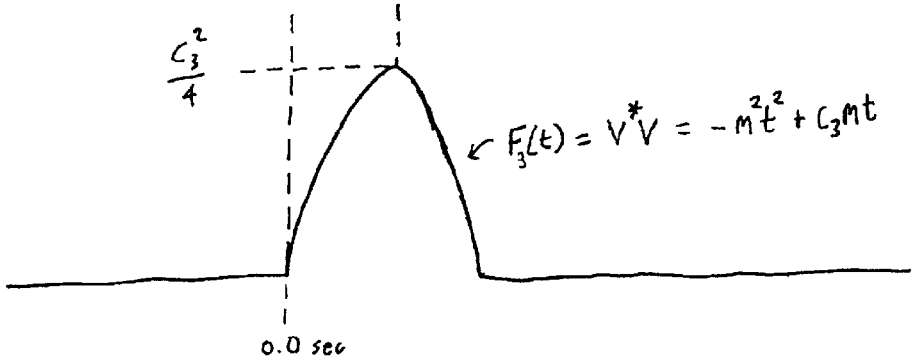

The product $F_X(t)$ of the rising signal waveform and the falling signal waveform, as observed in FIGS. 3b through 3d, produces a "peak" whose height is a function of the crossing point. Accordingly, the height of the "peak" may be used to measure the crossing point. Specifically, as described in more detail below, the square root of the peak height may be used as a direct or approximate measurement of the voltage level where the crossing point occurs.

As $F_X(t)$ describes a "peak", the height of the peak corresponds to the maximum value reached by $F_X(t)$. According to basic principles of calculus, the maximum value reached by an equation may be found by deriving where the equation's first derivative reaches zero. The first derivative of $F_X(t)$ may be expressed as $$F_X'(t)=-2m^2t+c_X m \qquad \text{Eqn. 5}$$

and, as such:

$$F_X'(t)=0 \text{ if } t=c_X/(2m). \qquad \text{Eqn. 6}$$

Substitution of t as expressed in Equation 6 into Equations 2,3, and 4 respectively yields:

$$v=mc_X/(2m)=c_X/2 \qquad \text{Eqn. 7}$$

$$v^*=(-mc_X/(2m))+c_X=c_X/2 \qquad \text{Eqn. 8}$$

$$F(t) = v^*v = (-m^2 c_x^2/(4m^2)) + (c_x^2 m/(2m)) \qquad \text{Eqn. 9}$$

$$= (-c_x^2/4) + (c_x^2/2) = c_x^2/4$$

From Equations 7 and 8 it is apparent that v=v* when $F_x(t)$ reaches a maximum. As such, because the crossing point in a logical transition corresponds to v=v*, the maximum height reached by the "peak" in $F_X(t)$ is aligned in time with the crossing point that is formed by the rising and falling waveforms of a logical transition whose product corresponds to $F_X(t)$. Furthermore, comparing Equation 9 with Equations 7 and 8, it is apparent that:

$$F(t)^{0.5}=(c_X^2/4)^{0.5}=c_X/2 \qquad \text{Eqn. 10}$$

or, better said, the square root of the maximum height of the peak is equal to the voltage level of the crossing point.

Thus, as seen in FIG. 3a, the crossing point 312 of the v*=−mt+$c_1$ falling waveform has a voltage level of $c_1/2$; and, as seen in FIG. 3b, the corresponding $F_1(t)$ waveform reaches a maximum height of $c_1^2/4$ at the temporal location of the crossing point 312. Similarly, as seen in FIG. 3a, the crossing point 311 of the v*=−mt+$c_2$ falling waveform has a voltage level of $c_2/2$; and, as seen in FIG. 3c, the corresponding $F_2(t)$ waveform reaches a maximum height of $c_2^2/4$ at the temporal location of the crossing point 311. Finally, as seen in FIG. 3a, the crossing point 310 of the v*=−mt+$c_3$ falling waveform has a voltage level of $c_3/2$; and, as seen in FIG. 3d, the corresponding $F_3(t)$ waveform reaches a maximum height of $c_3^2/4$ at the temporal location of the crossing point 310.

Figure 4:
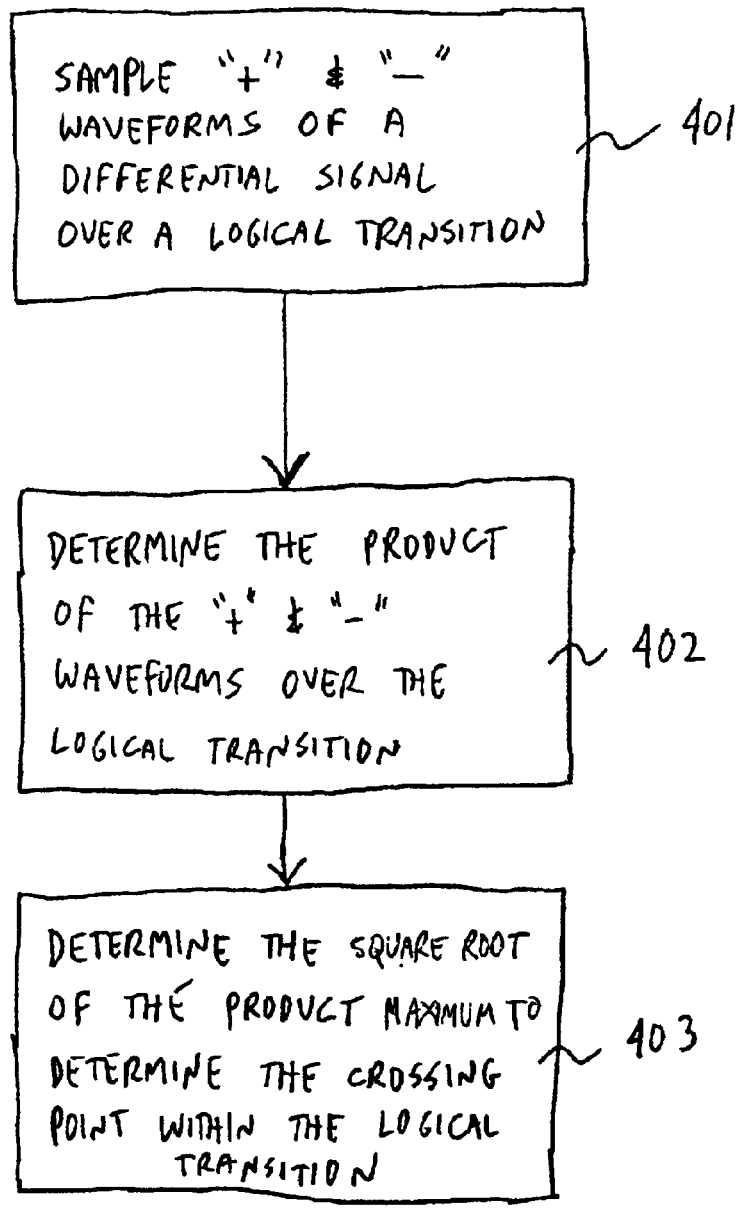
FIG. 4 shows an embodiment of a first methodology that may be used to measure the crossing point of a logical transition.

FIG. 4 shows an embodiment of a first methodology that may be used to measure the crossing point of a logical transition. According to the methodology of FIG. 4, both the + signal waveform and the − signal waveform of a differential signal are sampled 401 over a logical transition. Sampling is the act of taking samples of a waveform. For example, a digital oscilloscope typically takes voltage samples of a waveform at discrete time intervals in order to craft digital representations of various waveform "points" (e.g., as embodied within a byte or a group of bytes that represent the waveform voltage as well as another byte or group of bytes that represent the time at which the waveform voltage was sampled). These points may be referred to as samples, sample points, digital samples and the like.

As digital processing circuitry is typically cheaper and more versatile than analog processing circuitry, converting a waveform into digital samples allows for inexpensive yet robust signal processing and/or measurement opportunities that may be performed upon the sampled waveform. For example, in a simple case the samples are effectively plotted on a display. As a result, the sampled waveform appears on the display. In other cases, specific mathematical functions may be performed with the samples. Specifically, with respect to FIG. 4, the product of the + signal waveform and the − signal waveform (i.e., the multiplication of the waveforms) may be taken 402 over the sampled logical transition of the differential signal.

A differential signal, as noted, has two components (the + signal and the − signal) for each instant of time. As such, if a differential signal is sampled 401 as described just above, a pair of voltage samples should be taken during each sampling (a + voltage sample and a − voltage sample for each sampling time). The product of the + and − voltage samples of the same differential signal sampling corresponds to a discrete "point" on the $F_X(t)$ waveform as discussed with respect to FIGS. 3b through 3d. If the multiplication is performed for each differential signal sampling, a plurality of points that correspond to the F(t) waveform will be created. The multiplication of the samples may be easily accomplished with digital means such as software that runs on a processor or a logic circuit configured to perform the multiplication.

Figure 5:
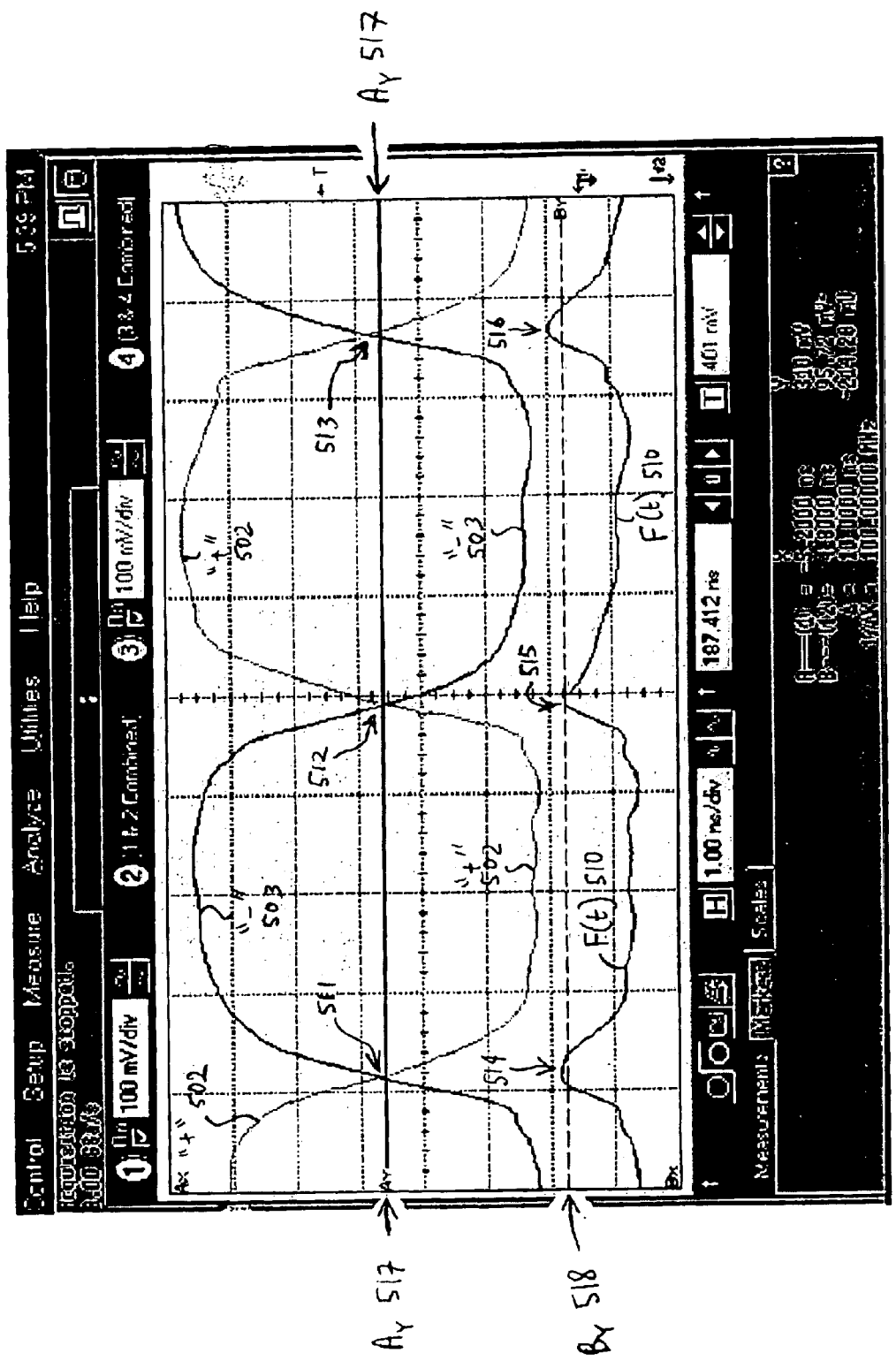
FIG. 5 shows an example of a display on an oscilloscope that is configured to perform the methodology of FIG. 4.

FIG. 5 shows an exemplary oscilloscope display having a sufficiently wide "time per division" setting that allows three logical transitions to be displayed in series (rather than overlayed). The differential signal includes a + signal waveform 502 and a − signal waveform 503. An F(t) signal 510 that corresponds to the product of the + signal waveform 502 and the − signal waveform 503 is also displayed. In the embodiment of FIG. 5, the oscilloscope used to display the sampled + and − signal waveforms 502, 503 also offers the capability to multiply these two waveforms 502, 503 and display the waveform F(t) 510 that results.

As three logical transitions are displayed in series in FIG. 5, three crossing points 511, 512, 513 are observed in FIG. 5. The crossing points may be individually referred to as the left crossing point 511, the middle crossing point 512 and the right crossing point 513. Close observation of FIG. 5 indicates that the "highest" crossing point (i.e., the crossing point that resides at a higher voltage level than the other crossing points) is the right crossing point 513 and that the "lowest" crossing point (i.e., the crossing point that resides at a lower voltage level than the other crossing points) is the middle crossing point 512.

Confirmation of this perspective may be made by referring to voltage level $A_Y$ 517 which, as drawn in FIG. 5, runs through the middle crossing point 512. The left 511 and right 513 crossing points both reside above the $A_Y$ level 517. As such, the $A_Y$ voltage level 517 and crossing point 512 correspond to the lowest crossing point. Referring now to the product waveform F(t) 510, note that the $B_Y$ voltage level 518 has been drawn through the maximum height of the middle "peak" 515.

Consistent with the theoretical discussion of the $F_X(t)$ waveform provided above with respect to FIGS. 3b through 3d, note that the maximum height of the left 514 and right 516 peaks associated with the F(t) waveform 510 are both above the maximum height of the middle peak 515. That is, as crossing points 511 and 513 are both above crossing point 512, their corresponding peaks 514 and 516 both rise above the maximum height of the middle peak 515.

Referring briefly back to FIG. 4, after the product of the + signal and − signal waveforms is determined 402, the square root of the product maximum is determined 403 so that the voltage level of the crossing point (within the logical transition) can be determined. Referring to the lower right hand portion of FIG. 5, note that the $A_Y$ voltage level 517 (which corresponds to the middle crossing point 512 voltage) is 310 mv and the $B_Y$ voltage level (which corresponds to the maximum height of peak 515) is 95.72 mV$^2$.

The square root of the maximum height of peak 515 corresponds to $(95.72E-3\ v^2)^{0.5}=0.309\ v=309$ mv. As such, the square root of the maximum height of peak 515 is within 1 mv of the crossing point 512 voltage level of 310 mv. This small error may be the result of deviations in the logical transition away from the "straight line" model described above with respect to FIG. 3a (e.g., differences between the falling rate of the − signal waveform 503 and the rising rate of the + signal waveform 502 through the crossing point 512) or due to limited oscilloscope resolution.

To the extent that deviations from the "straight-line" model occur (e.g., as the falling rate of a signal deviates from the rising rate of the other signal within a logical transition) some degree of error may be introduced into the crossing point measurement described herein. In such instances, the square root of the peak maximum may be viewed more as an accurate approximation of the crossing point. That is the extent of the deviation from the "straight-line" model, as exhibited by typical waveforms within a logical transition, is insubstantial enough to render the "approximate" crossing point determined by the methodology of FIG. 4 suitable for many (if not all) measurement applications.

Note that the oscilloscope display of FIG. 5 corresponds to a "single shot" mode or a "continuous" mode. Under a "single shot" mode, an oscilloscope will plot (or otherwise present) only one sweep of samples across the temporal (horizontal) width of the display. Under a "continuous" mode, an oscilloscope will continuously plot (or otherwise present) a sweep of samples across the temporal (horizontal) width of the display such that new samples replace (or "refresh") older samples at the same temporal location. As a result, in a sense, a subsequent waveform is continuously overwriting a previous waveform on the display. Note that under either the "single shot" mode or the "continuous" mode, therefore, waveforms from different sampling sweeps are not overlayed "on top of" each other.

Figure 1A:
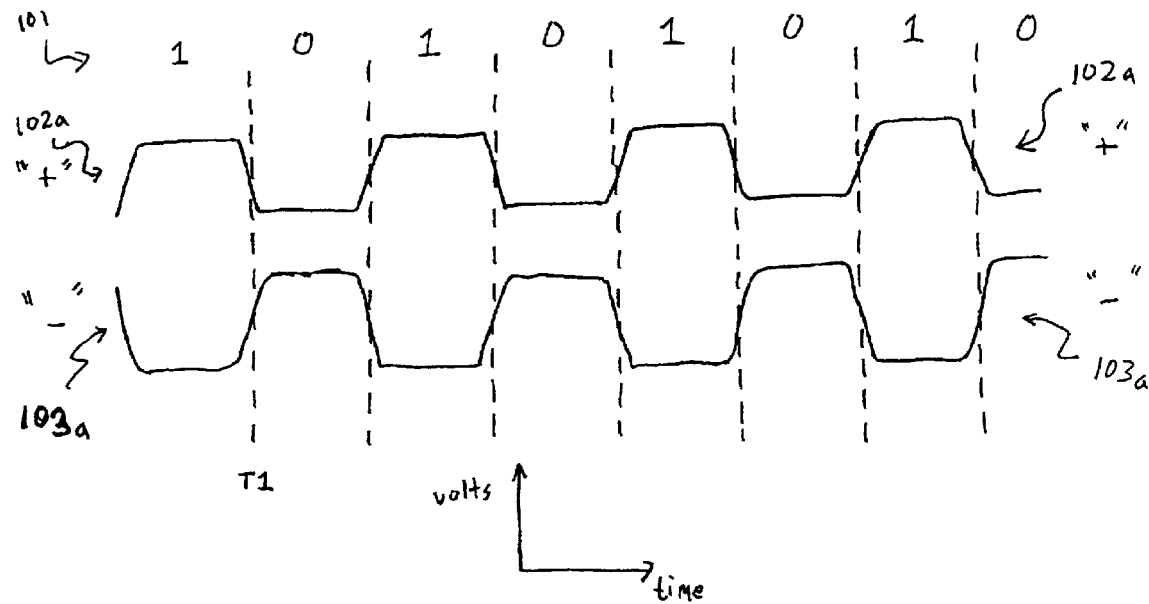
FIG. 1a shows an embodiment of a differential signal
Figure 1B:
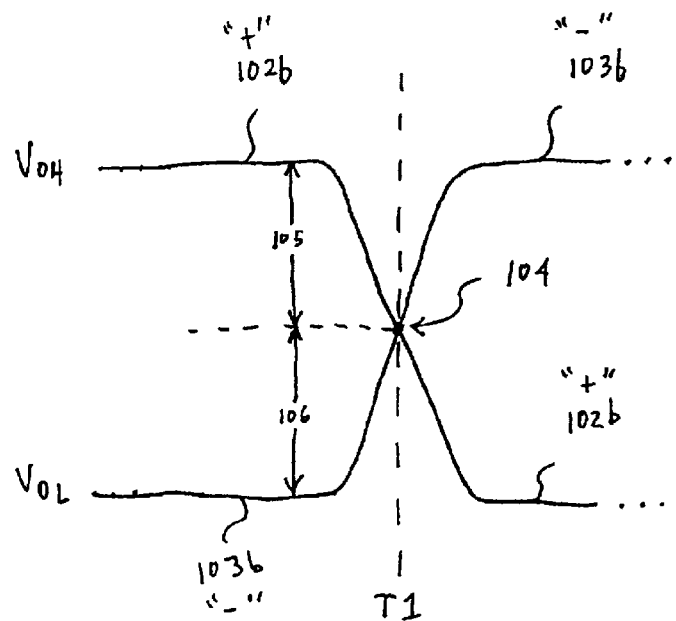
Figure 2:
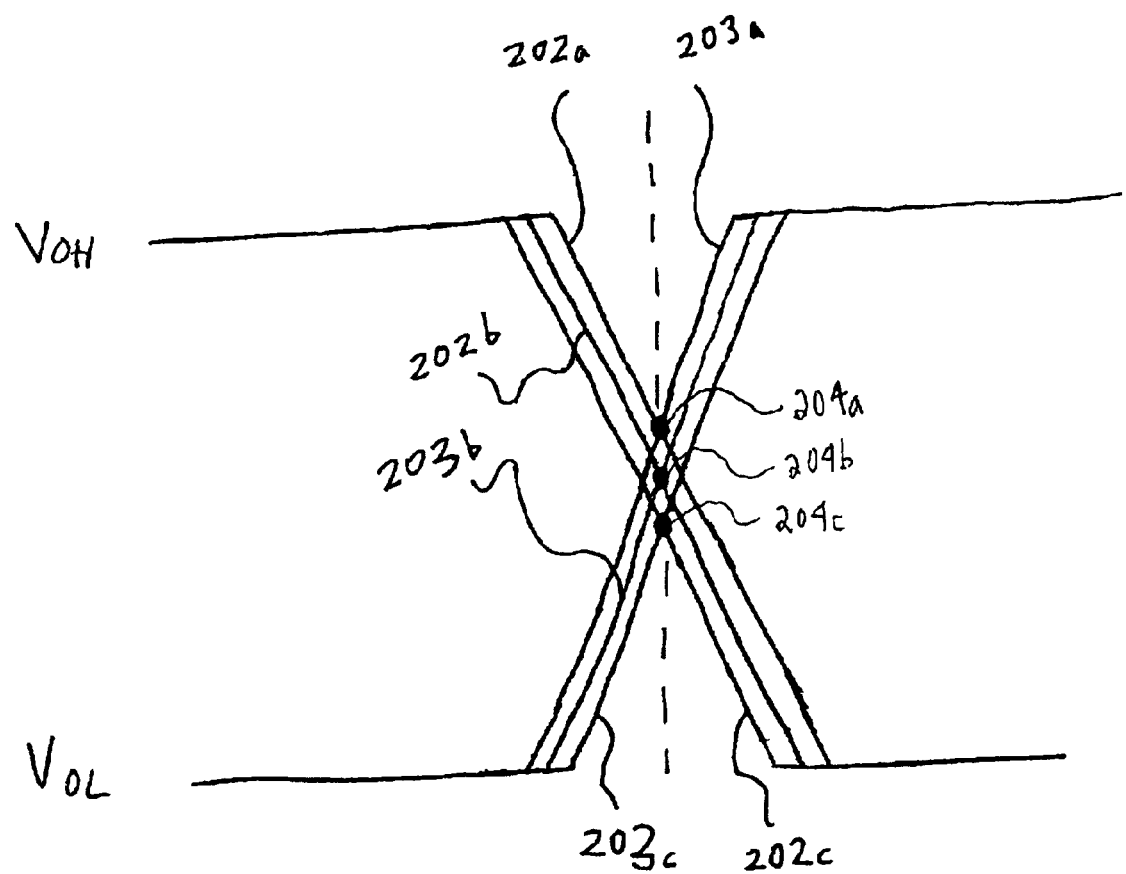
FIG. 2 shows an embodiment of a three logical transitions overlayed upon one another.
Figure 6:
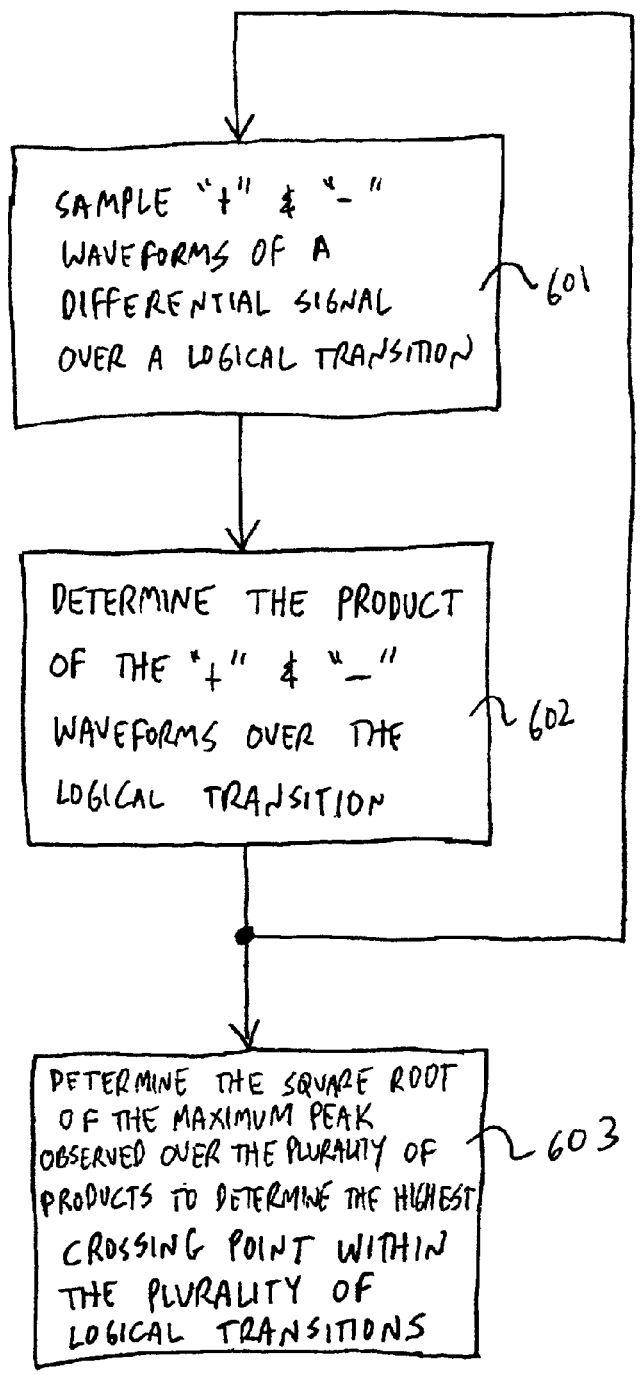
FIG. 6 shows an embodiment of a second methodology that may be used to measure the crossing point of a logical transition.
Figure 7:
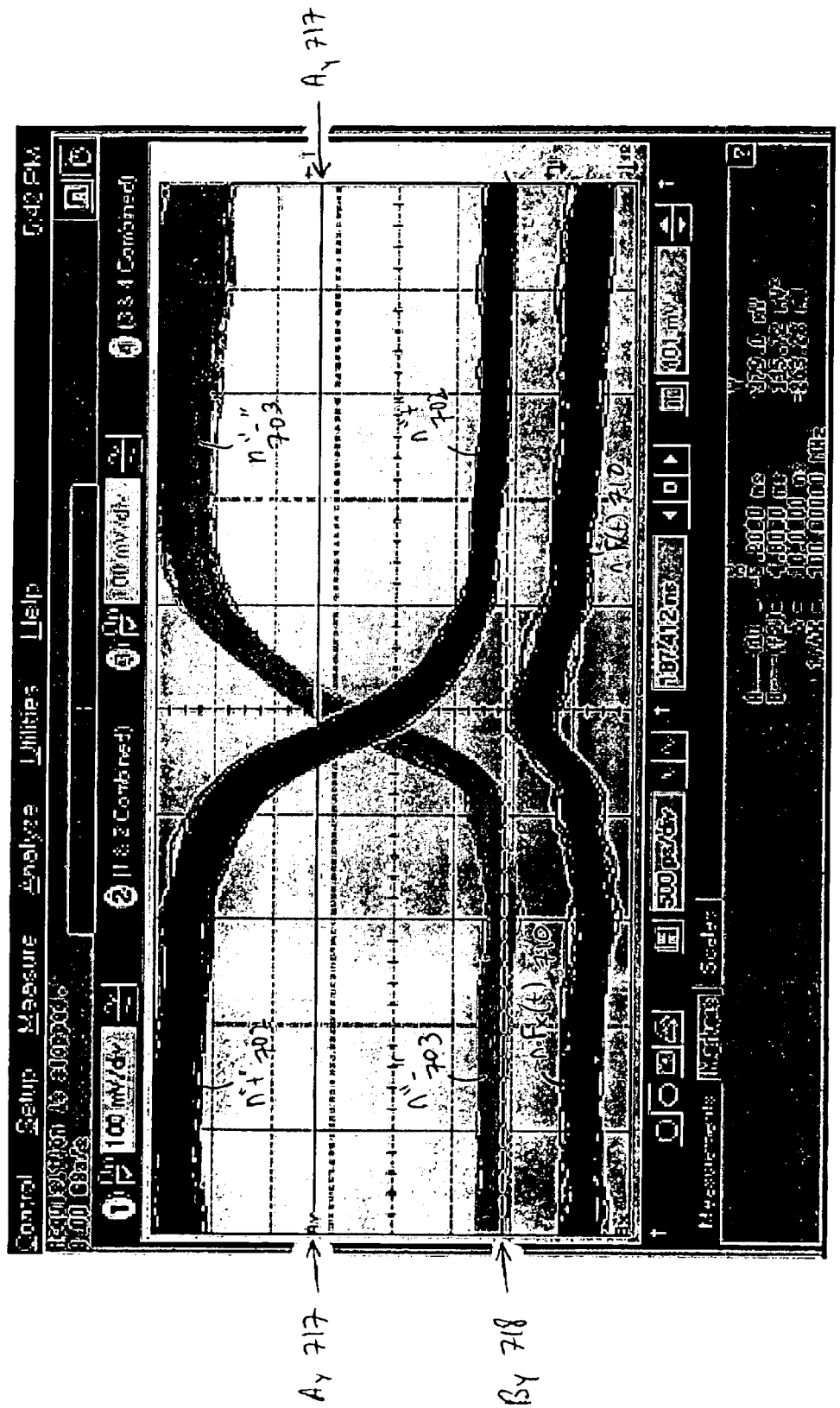
FIG. 7 shows an example of a display on an oscilloscope that is configured to perform the methodology of FIG. 6.

Under another mode referred to as "persistence" mode, however, waveforms from different sampling sweeps are overlayed on top of each other (e.g., a subsequent waveform is overlayed on top of a previous waveform). As such waveform displays that appear similar to FIG. 2 or FIG. 3a may be generated. FIG. 6 shows a methodology that may be used under a persistence mode (or any other mode where waveforms from different sampling sweeps are overlayed "on top of" each other) and FIG. 7 shows an exemplary oscilloscope display after a number "n" of sampling sweeps have been taken with their corresponding waveforms displayed as overlayed upon one other.

According to the methodology of FIG. 6, the "+" and "−" waveforms of a differential signal are sampled 601 over a logical transition as described with respect to methodology 401 of FIG. 4. Then, the product of the "+" and "−" waveforms over the logical transition is determined 602 as described with respect to methodology 402 of FIG. 4. In the exemplary methodology of FIG. 6, this process then repeats so that a plurality of +/− waveform pairs are sampled 601 and a plurality of corresponding products are determined 602.

The sampled waveform data (as well as the product data) may also be displayed (e.g., for each repetitive iteration) so that the plurality of waveforms are overlayed upon one another. The plurality of products may also be similarly displayed as well. FIG. 7 shows an example where "n" iterative loops have been executed, n "+" signal waveforms 702 are displayed, n "−" signal waveforms 703 are displayed and n $F_X(t)$ product waveforms 510 are displayed.

For each iteration (or, alternatively, after a set number of iterations have been completed), the maximum product value determined so far is identified so that its square root may be taken 603. The square root of the maximum product value will correspond to the highest crossing point value observed within the plurality of logical transitions. Thus, referring to FIG. 7, the maximum product value observed across all "n" product waveforms 710 corresponds to voltage level $B_Y$ 718 which is shown to be 115.72E-3v$^2$ in the lower right hand corner of FIG. 7. The square root of 115.72E-3v2 is 0.3402 v.

As such, the highest crossing point reached by the n logical transitions observed in FIG. 7 is positioned approximately at 340 mv. Note that, referring to the lower right hand corner of FIG. 7, the voltage level $A_Y$ 717 of FIG. 7 is positioned at 379 mv. The "apparent" discrepancy between the square root of voltage level $B_Y$ 718 (340 mv) and voltage level $A_Y$ 717 (379 mv) is resolved upon the realization that voltage level $A_Y$ 717 is not positioned at the true highest crossing point demonstrated by the logical transition waveforms of FIG. 7.

That is, voltage level $A_Y$ 717 is actually positioned at the highest common voltage experienced by both a falling + waveform and a rising − waveform. But this is different than the common voltage experienced by a falling + waveform and a rising − waveform that are members of the same logical transition. Better said, voltage level $A_Y$ 717 corresponds to an "apparent" (as opposed to "actual") crossing point that is formed by the overlay of the falling + waveform that begins to fall at the latest time (as compared to the other falling + waveforms) with the rising − waveform that begins to rise at the earliest time (as compared to the other rising waveforms).

As such, the waveforms described immediately above are members of two different logical transitions and therefore do not correspond to an actual crossing point. Voltage level $A_Y$ 717 is a misleading visual effect caused by the overlay of waveforms during a "persistence" display mode; and, the square root of voltage level $B_Y$ 716 serves as a better measurement of the highest crossing point observed in the n logical transitions that are displayed in FIG. 7. With this understanding, it is clear that the measurement technique(s) described herein are a clearly superior approach to those prior art techniques that have interpreted voltage level $A_Y$ 717 as the highest crossing point observed for a plurality of logical transitions.

Referring back to FIG. 3a, note that the placement of the origin 313 for the vt coordinate system corresponds to the logical low voltage $V_{OL}$ being set at 0.0 v. This corresponds to many logical circuit applications (e.g., including those manufactured with Complementary Metal Oxide Semiconductor (CMOS) technology) where the logical low voltage $V_{OL}$ is designed to be equal to a ground voltage of 0.0 v. In test measurement circumstances where $V_{OL}$ does not correspond to 0.0 v for the circuitry being tested, the waveforms as measured may be displayed as such (i.e., with $V_{OL}$=0.0 v) by subtracting the $V_{OL}$ voltage from the sampled waveforms.

For example, if the $V_{OL}$ voltage level corresponds to −1.8 v, −1.8 v may be subtracted from the measured waveforms (which corresponds to adding +1.8 v to the sampled waveforms). As a result, the measured waveforms will be raised by a DC offset of 1.8 v and the $V_{OL}$ level of the displayed waveform will appear as being aligned with 0.0 v. The subtraction of the $V_{OL}$ voltage level from the measured waveform may be accomplished in various ways such as actually (e.g., by subtracting the $V_{OL}$ voltage with testing interface hardware) or effectively (e.g., with mathematical functions offered by the display of an oscilloscope).

As such, the crossing point voltage may be generally expressed as:

$$V_{CP}=(F_{MAX}(t))+V_{OL} \quad \text{Eqn. 10}$$

where $V_{CP}$ is the crossing point voltage of a logical transition, $V_{OL}$ is the logic level low voltage applicable to the + and − signal waveforms and $F_{MAX}(t)$ is the maximum peak (in volts$^2$) observed within the F(t) waveform for the logical transition. Equation 10 effectively "removes" any actual or effective adjustment made to the signal levels (as described just above) so that the true crossing point observed by the circuitry being tested is realized.

The technique described above with respect to FIG. 6 may be slightly modified so that the lowest crossing point observed within a plurality of logical transitions can be determined. Specifically, within methodology 603, the word "maximum" may be replaced with the word "minimum" and the word "highest" may be replaced with the word "lowest". As such, the square root of the minimum peak observed over the plurality of products may be determined so that the lowest crossing point within the plurality of logical transitions can be determined.

The mathematical functions offered by some oscilloscopes, however, do not allow the minimum peak of the product waveform to be identified. As such an alternative mathematical model, which is provided in FIG. 8a, may be used to determine the lowest crossing point observed within a plurality of logical transitions. According to the mathematical model of FIG. 8a, it may be shown that the maximum peak of the product waveform $F_X(t)$ rises as the crossing point voltage falls.

As such, the lowest crossing point voltage observed within a plurality of logical transitions corresponds to the maximum observed $F_X(t)$ peak. The mathematical model of FIG. 8a therefore allows the minimum crossing point voltage to be identified with a "maximum" operation performed on the $F_X(t)$ waveform(s). For example, referring to FIGS. 8a through 8d, note that the lowest crossing point voltage 812 produces the largest product waveform $F_6(t)$ peak (at $(C_6^2)/4$ v$^2$) as observed in FIG. 8d; while, the highest crossing point voltage 810 produces the lowest product waveform $F_4(t)$ peak (at $(C_4^2)/4$ v$^2$) as observed in FIG. 8b.

Figure 8A:
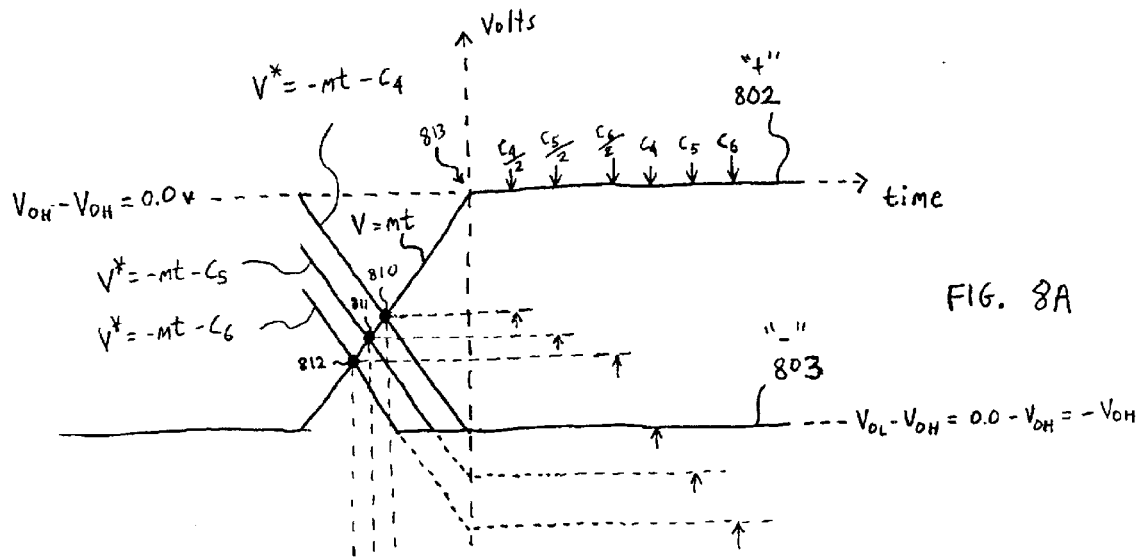
FIG. 8a shows another model for a differential signal logical transition.
Figure 8B:
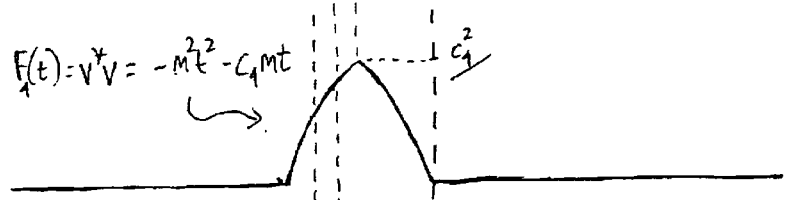
Figure 8C:
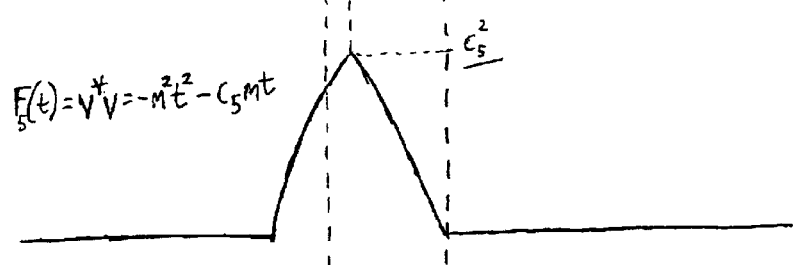
Figure 8D:
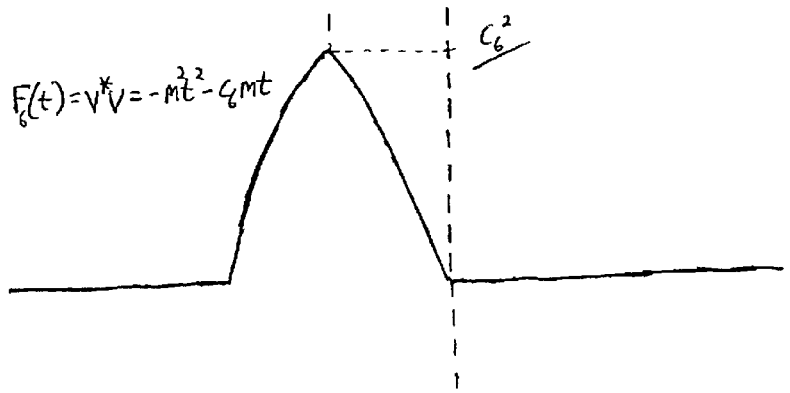

The inverse relationship between the crossing point voltage and its F(t) peak results from the "re-alignment" of the vt coordinate system of FIG. 8a as compared to that of FIG. 3a. Specifically, whereas the 0.0 voltage reference corresponds to the $V_{OL}$ voltage level in the mathematical model FIG. 3a; note that, within the mathematical model of FIG. 8a, the 0.0 voltage reference corresponds to the $V_{OH}$ voltage level. A common mathematical feature of both models (i.e., that of FIG. 3a and that of FIG. 8a) is that an $F_X(t)$ peak rises as its corresponding crossing point deviates farther away from the 0.0 v reference.

The mathematical consequence of re-aligning the 0.0 v reference with the $V_{OH}$ voltage level (as observed in FIG. 8a) is that the lowest crossing point 812 is farthest from the 0.0 v reference; whereas (as observed in FIG. 3a) the lowest crossing point 312 is closest to the 0.0 v reference. As such, the lowest crossing point 812 of FIG. 8a produces the highest product waveform $F_6(t)$ peak $((C_6^2)/4$ v$^2)$ while the lowest crossing point 312 of FIG. 3a produces the lowest product waveform $F_1(t)$ peak $((C_1^2)/4$ v$^2)$.

Note that many test measurement circumstances may arise where $V_{OH}$ does not correspond to 0.0 v for the circuitry being tested. As such, the waveforms as measured may be displayed as such (i.e., with $V_{OH}$=0.0 v) by subtracting the $V_{OH}$ voltage from the sampled waveforms. For example, if the $V_{OH}$ voltage level corresponds to +1.8 v, +1.8 v may be subtracted from the measured waveforms (which corresponds to reducing the sampled waveforms by 1.8 v). As a result, the measured waveforms will be lowered by a DC offset of 1.8 v and the $V_{OH}$ level of the displayed waveform will appear as being aligned with 0.0 v. The subtraction of the $V_{OH}$ voltage level from the measured waveform may be accomplished in various ways such as actually (e.g., by subtracting the $V_{OH}$ voltage with testing interface hardware) or effectively (e.g., with mathematical functions offered by the display of an oscilloscope).

A mathematical derivation similar to that provided above with respect to the discussion of FIGS. 3a through 3d will show that, according to the mathematical model of FIG. 8a, the square root of the maximum peak reached by a product waveform $F_X(t)$ will provide the distance (in volts) that the crossing point voltage is beneath the $V_{OH}$ reference level. As such, the crossing point voltage may be calculated according to:

$$V_{CP}=V_{OH}-(F_{MAX}(t))^{0.5} \quad \text{Eqn. 11}$$

where $V_{CP}$ is the crossing point voltage of a logical transition, $V_{OH}$ is the logic level high voltage applicable to the + and − signal waveforms and $F_{MAX}(t)$ is the maximum peak (in volts$^2$) observed within the F(t) waveform for the logical transition. Equation 11 effectively "removes" any actual or effective adjustment made to the signal levels (as described just above) so that the true crossing point observed by the circuitry being tested is realized.

Figure 9:
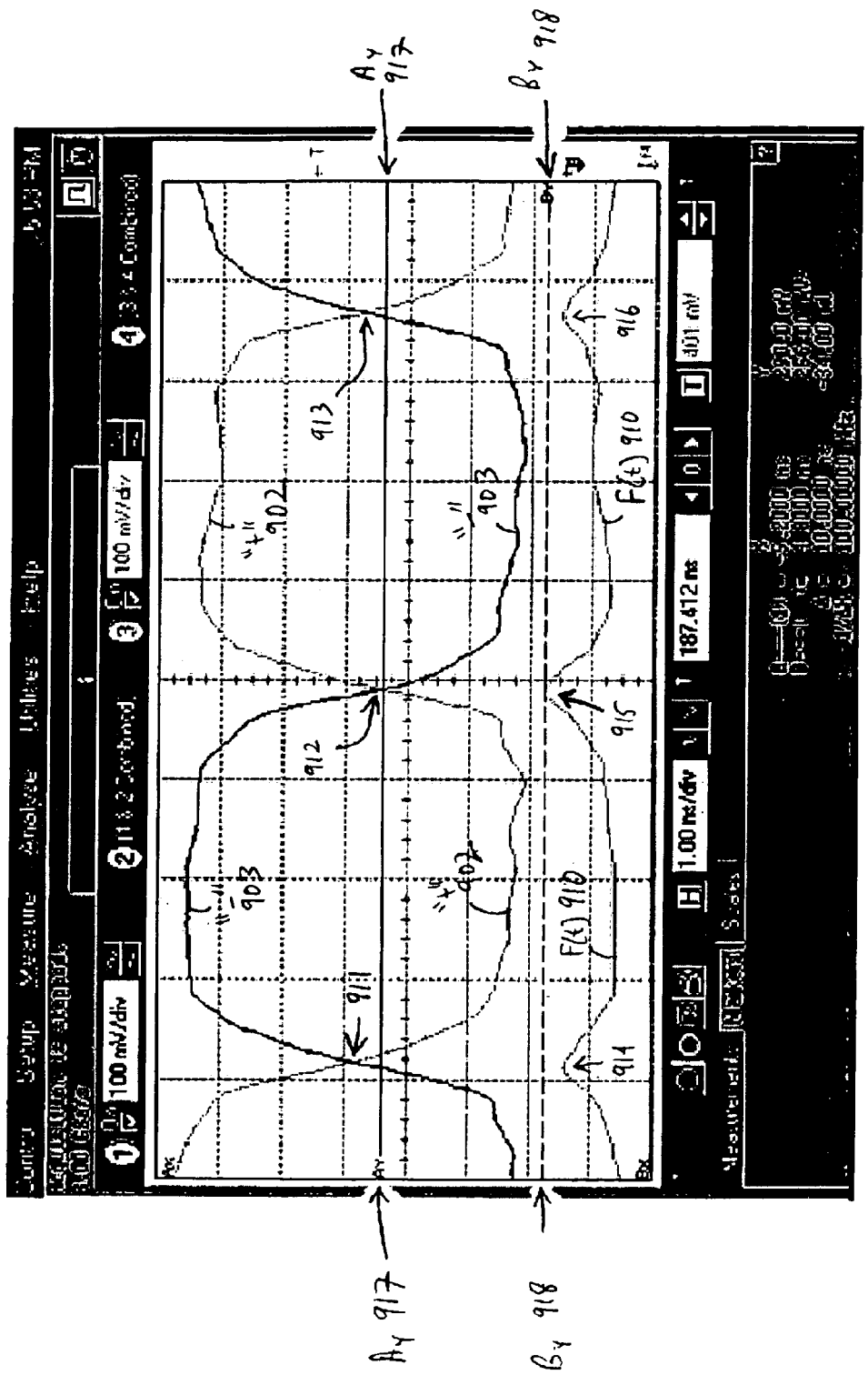
FIG. 9 shows an example of another display on an oscilloscope that is configured to perform the methodology of FIG. 4.

FIG. 9 shows an exemplary oscilloscope display wherein the 0.0 v reference level is configured to be aligned with the $V_{OH}$ voltage for the product waveform F(t) 910; and, the methodology of FIG. 4 is executed. From FIG. 9 it is apparent that the middle crossing point 912 is the lowest crossing point yet produces the highest product waveform F(t) peak 915. The circuitry being tested in FIG. 9 has a $V_{OH}$ level of 0.8 v=800 mv. Referring to the lower right hand corner of FIG. 9, note that the square root of the $B_Y$ voltage level 918 (which is measured at 0.256 $v^2$=256 $mv^2$) is 0.506 v=506 mv.

Substitution into Equation 11 yields 800 mv–506 mv=294 mv; and, the $A_Y$ voltage level 917 that corresponds to the actual crossing point voltage is shown as 290 mv. As such, sufficient accuracy is once again demonstrated. Note that, in this case, the product waveform F(t) 910 is calculated with positive and negative signal waveforms that have been "shifted" by $V_{OH}$. However, the displayed waveforms 902, 903 have not been shifted so that the actual + and – signal waveforms 902, 903 can be displayed.

That is, the displayed + and – waveforms 902, 903 are not "shifted" by $V_{OH}$ while the + and – waveforms that are multiplied together to form the product waveform F(t) 910 are "shifted" by $V_{OH}$ so as to be consistent with the mathematical model provided in FIG. 8a. As such, the displayed + and – waveforms may be "different" (in terms of their DC offset) than the + and – waveforms that are multiplied together to form the product waveform. A similar approach may be utilized with respect to the mathematical model of FIG. 3a as well.

Figure 10:
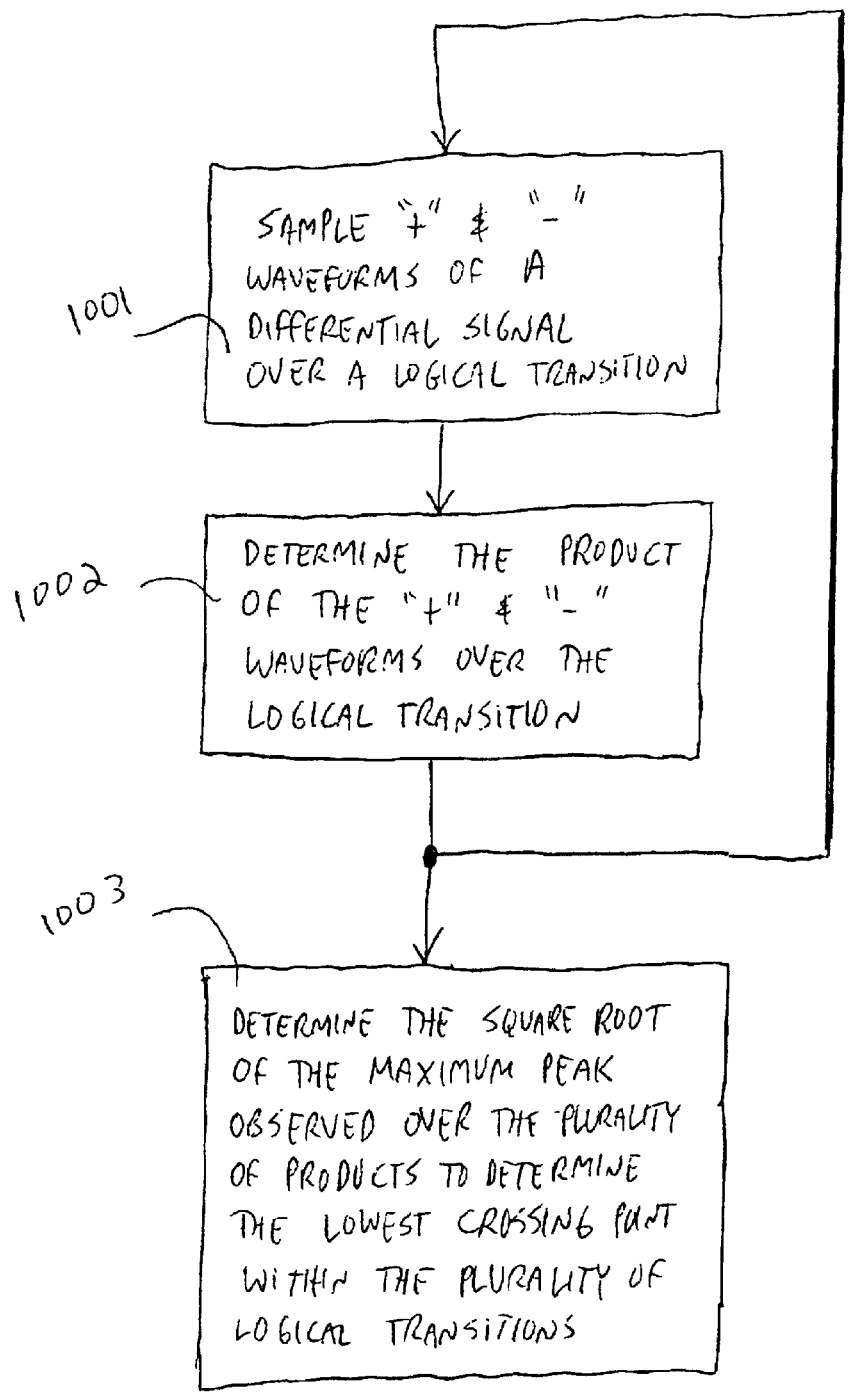
FIG. 10 shows an embodiment of a third methodology that may be used to measure the crossing point of a logical transition.
Figure 11:
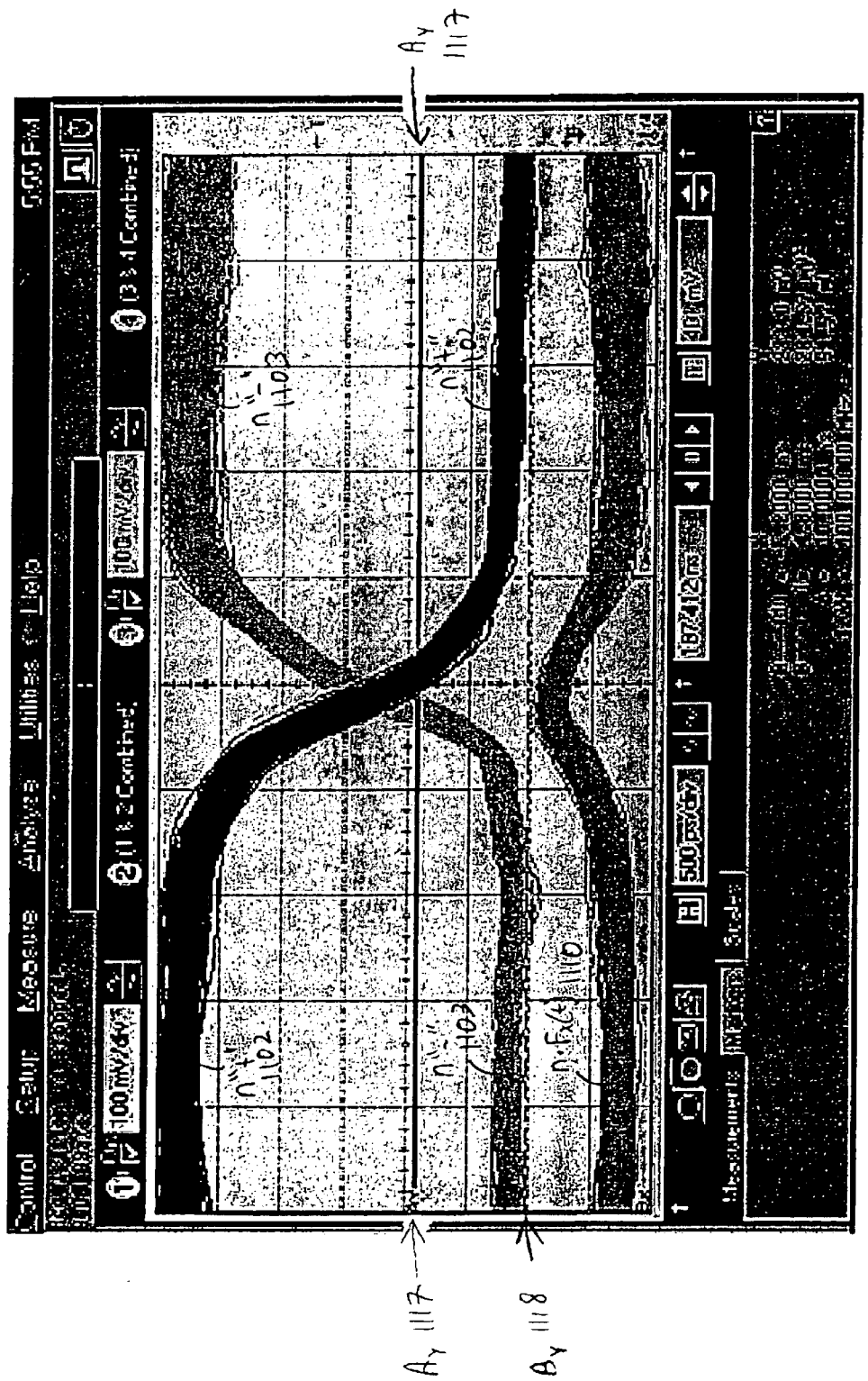
FIG. 11 shows an example of a display on an oscilloscope that is configured to perform the methodology of FIG. 10.

FIG. 10 shows a methodology that may be used according to the mathematical model of FIG. 8a under a persistence mode (or any other mode where waveforms from different sampling sweeps are overlayed "on top of" each other) and FIG. 11 shows an exemplary oscilloscope display after a number "n" of sampling sweeps have been taken with their corresponding waveforms displayed as overlayed upon one other.

According to the methodology of FIG. 8, the "+" and "–" waveforms of a differential signal are sampled 1001 over a logical transition as described with respect to methodology 401 of FIG. 4. Then, the product of the "+" and "–" waveforms over the logical transition is determined 1002 as described with respect to methodology 402 of FIG. 4. In the exemplary methodology of FIG. 10, this process then repeats so that a plurality of +/–waveform pairs are sampled 1001 and a plurality of corresponding products are determined 1002.

The sampled waveform data (as well as the product data) may also be displayed (e.g., for each repetitive iteration) so that the plurality of waveforms are overlayed upon one another. The plurality of products may also be similarly displayed as well. FIG. 11 shows an example where "n" iterative loops have been executed, n "+" signal waveforms 1102 are displayed, n "–" signal waveforms 1103 are displayed and n $F_X$(t) product waveforms 1110 are displayed.

For each iteration (or, alternatively, after a set number of iterations have been completed), the maximum product value determined so far is identified so that its square root may be taken 1003. The square root of the maximum product value will correspond to the lowest crossing point value observed within the plurality of logical transitions. Thus, referring to FIG. 11, the maximum product value observed across all "n" product waveforms 1110 corresponds to voltage level $B_Y$ 1118 which is shown to be 284.57E-3$v^2$ in the lower right hand corner of FIG. 11. The square root of 284.57E-3$v^2$ is 0.533 v.

As such, using Equation 11 the lowest crossing point reached by the n logical transitions observed in FIG. 11 is positioned approximately at 0.8-0.533=0.267 v. Note that, referring to the lower right hand corner of FIG. 11, the voltage level $A_Y$ 1117 of FIG. 11 is positioned at 233 mv. For similar reasons provided above with respect to the display provided in FIG. 7, note that voltage level $A_Y$ 1117 is not positioned at the true lowest crossing point demonstrated by the logical transition waveforms of FIG. 11. That is, voltage level $A_Y$ 1117 corresponds to the common voltage experienced by the latest rising – signal waveform (as compared to the other – signal waveforms) and the earliest falling + signal waveform (as compared to the other + signal waveforms) where the latest rising – signal waveform and the earliest falling + signal waveform do not belong to the same logical transition.

It is important to point that the methodologies discussed above may be performed completely (or in part) by an oscilloscope, by a combination of an oscilloscope and a computing device (e.g., a computer such as a personal computer (PC)) that is coupled to an oscilloscope) or a computing device coupled to a signal sampling apparatus (e.g., sampling circuitry that is coupled to a probe that connects to the circuitry under test). The computing device may perform various aspects of the methodologies described above, depending on designer preference.

For example, referring to FIG. 4 as just one example, the oscilliscope may be designed to sample the + and – signal waveforms 401 while the computing device may be designed to calculate the product of the + and – waveforms 402 as well as determine 403 the square root of the product. As another alternative example, the computing device may only determine 403 the square root. As another alternative, the oscilliscope performs the entire method 401, 402, 403. Analagous configurations may be implemented with respect to the methodologies of FIGS. 6 and 10.

It is also important to point out that the methodologies described above do not need to involve the use of a display. Furthermore, for those embodiments that do involve the use of a display, the computing device may present the display (e.g., on a computer screen). As such, displays are not to be construed as limited solely to being a component of an oscilloscope.

Note also that the methodologies described above may be performed at least partially through the use of software programs that are executed on some form of digital processing system (e.g., one or more microprocessors or other device that can execute a software program). For example, the sampling of the + and – waveforms 401, 601, 1001 described above with respect to FIGS. 4, 6, and 10 may be performed under the control (and/or oversight) of a software program responsible for the testing of the circuitry under test. The determination 402, 602, 1002 of the product of the + and – signal waveforms and the determination of its square root 403, 603, 1003 may similarly be performed with software.

Thus, it is to be understood that embodiments of this invention may be implemented as or in combination with software programs executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   a) forming a product waveform by multiplying a positive signal waveform and negative signal waveform, said positive signal waveform and said negative signal waveform being representative of a logical transition within a differential signal; and
   b) determining the crossing point voltage of said logical transition within said differential signal by calculating the square root of a maximum of said product waveform.

2. The method of claim 1 further comprising sampling said positive and negative signal waveforms from an electronic circuit that transmits said differential signal.

3. The method of claim 2 wherein said sampling is performed with an oscilloscope.

4. The method of claim 2 wherein said electronic circuit further comprises a CMOS circuit.

5. The method of claim 1 wherein said positive and negative signal waveforms have a 0.0 voltage reference that is aligned with a low logic level of said positive and negative signal waveforms.

6. The method of claim 1 wherein said positive and negative signal waveforms have a 0.0 voltage reference that is aligned with a high logic level of said positive and negative signal waveforms.

7. The method of claim 1 further comprising displaying said product waveform.

8. The method of claim 7 wherein said product waveform is displayed on an oscilloscope.

9. A method, comprising:
   determining the highest crossing point reached by a plurality of logical transitions within a differential signal by calculating the square root of the maximum height reached by a plurality of product waveforms, wherein each of said logical transitions has a corresponding product waveform, wherein each of said product waveforms is a product of a positive signal waveform and a negative signal waveform that represent its corresponding logical transition.

10. The method of claim 9 further comprising sampling said positive and negative signal waveforms from an electronic circuit that transmits said differential signal.

11. The method of claim 10 wherein said sampling is performed with an oscilloscope.

12. The method of claim 10 wherein said electronic circuit further comprises a CMOS circuit.

13. The method of claim 9 further comprising displaying said plurality of product waveforms.

14. The method of claim 13 wherein said plurality of product waveforms are displayed on an oscilloscope.

15. The method of claim 9 wherein said positive and negative signal waveforms have a 0.0 voltage reference that is aligned with a low logic level of said positive and negative signal waveforms.

16. The method of claim 15 further comprising sampling said positive and negative signal waveforms from an electronic circuit that transmits said differential signal.

17. The method of claim 16 wherein said sampling is performed with an oscilloscope.

18. The method of claim 16 wherein said electronic circuit further comprises a CMOS circuit.

19. The method of claim 15 further comprising displaying said plurality of product waveforms.

20. The method of claim 19 wherein said plurality of product waveforms are displayed on an oscilloscope.

21. A method, comprising:
   determining the lowest crossing point reached by a plurality of logical transitions within a differential signal by calculating the square root of the maximum height reached by a plurality of product waveforms, wherein each of said logical transitions has a corresponding product waveform, wherein each of said product waveforms is a product of a positive signal waveform and a negative signal waveform that represent its corresponding logical transition.

22. The method of claim 21 further comprising sampling said positive and negative signal waveforms from an electronic circuit that transmits said differential signal.

23. The method of claim 22 wherein said sampling is performed with an oscilloscope.

24. The method of claim 22 wherein said electronic circuit further comprises a CMOS circuit.

25. The method of claim 21 further comprising displaying said plurality of product waveforms.

26. The method of claim 25 wherein said plurality of product waveforms are displayed on an oscilloscope.

27. The method of claim 21 wherein said positive and negative signal waveforms have a 0.0 voltage reference that is aligned with a high logic level of said positive and negative signal waveforms.

28. The method of claim 27 further comprising sampling said positive and negative signal waveforms from an electronic circuit that transmits said differential signal.

29. The method of claim 28 wherein said sampling is performed with an oscilloscope.

30. The method of claim 28 wherein said electronic circuit further comprises a CMOS circuit.

31. The method of claim 27 further comprising displaying said plurality of product waveforms.

32. The method of claim 31 wherein said plurality of product waveforms are displayed on an oscilloscope.

33. A machine readable medium having stored thereon sequences of instructions which are executable by a digital processing system, and which, when executed by the digital processing system, cause the system to perform a method comprising:
   a) forming a product waveform by multiplying a positive signal waveform and negative signal waveform, said positive signal waveform and said negative signal waveform being representative of a logical transition within a differential signal; and
   b) determining the crossing point voltage of said logical transition within said differential signal by calculating the square root of a maximum of said product waveform.

34. The machine readable medium of claim 33 wherein said positive and negative signal waveforms have a 0.0 voltage reference that is aligned with a low logic level of said positive and negative signal waveforms.

35. The machine readable medium of claim 33 wherein said positive and negative signal waveforms have a 0.0 voltage reference that is aligned with a high logic level of said positive and negative signal waveforms.

36. The machine readable medium of claim 33 wherein said method further comprises displaying said product waveform.

37. The machine readable medium of claim 36 wherein said product waveform is displayed on an oscilloscope.

38. A machine readable medium having stored thereon sequences of instructions which are executable by a digital processing system, and which, when executed by the digital processing system, cause the system to perform a method comprising:

determining the highest crossing point reached by a plurality of logical transitions within a differential signal by calculating the square root of the maximum height reached by a plurality of product waveforms, wherein each of said logical transitions has a corresponding product waveform, wherein each of said product waveforms is a product of a positive signal waveform and a negative signal waveform that represent its corresponding logical transition.

39. The machine readable medium of claim 38 wherein said method further comprises displaying said plurality of product waveforms.

40. The machine readable medium of claim 39 wherein said plurality of product waveforms are displayed on an oscilloscope.

41. The machine readable medium of claim 38 wherein said positive and negative signal waveforms have a 0.0 voltage reference that is aligned with a low logic level of said positive and negative signal waveforms.

42. The machine readable medium of claim 41 wherein said method further comprises displaying said plurality of product waveforms.

43. The machine readable medium of claim 42 wherein said plurality of product waveforms are displayed on an oscilloscope.

44. A machine readable medium having stored thereon sequences of instructions which are executable by a digital processing system, and which, when executed by the digital processing system, cause the system to perform a method comprising:

determining the lowest crossing point reached by a plurality of logical transitions within a differential signal by calculating the square root of the maximum height reached by a plurality of product waveforms, wherein each of said logical transitions has a corresponding product waveform, wherein each of said product waveforms is a product of a positive signal waveform and a negative signal waveform that represent its corresponding logical transition.

45. The machine readable medium of claim 44 wherein said method further comprises displaying said plurality of product waveforms.

46. The machine readable medium of claim 45 wherein said plurality of product waveforms are displayed on an oscilloscope.

47. The machine readable medium of claim 44 wherein said positive and negative signal waveforms have a 0.0 voltage reference that is aligned with a high logic level of said positive and negative signal waveforms.

48. The machine readable medium of claim 47 wherein said method further comprises displaying said plurality of product waveforms.

49. The machine readable medium of claim 48 wherein said plurality of product waveforms are displayed on an oscilloscope.

* * * * *

UNITED STATES PATENT AND TRADEMARK OFFICE
CERTIFICATE OF CORRECTION

PATENT NO. : 6,785,621 B2
DATED : August 31, 2004
INVENTOR(S) : Ebert

It is certified that error appears in the above-identified patent and that said Letters Patent is hereby corrected as shown below:

Column 4,
Line 18, delete "$VO_H$" and insert -- $V_{OH}$ --.

Signed and Sealed this

Twelfth Day of April, 2005

JON W. DUDAS
*Director of the United States Patent and Trademark Office*